(12) United States Patent
Ward et al.

(10) Patent No.: US 12,243,078 B2
(45) Date of Patent: *Mar. 4, 2025

(54) METHOD FOR DISPLAYING CONTENTS AND DIGITAL DISPLAY SYSTEM

(71) Applicant: VIOOH LIMITED, London (GB)

(72) Inventors: Carrie Ward, St Albans (GB); Ludovic Menard, Nîmes (FR); Borahn Tarridec, London (GB); Andrew Block, London (GB)

(73) Assignee: VIOOH LIMITED, London (GB)

( * ) Notice: Subject to any disclaimer, the term of this patent is extended or adjusted under 35 U.S.C. 154(b) by 340 days.

This patent is subject to a terminal disclaimer.

(21) Appl. No.: 17/680,206

(22) Filed: Feb. 24, 2022

(65) Prior Publication Data

US 2022/0188875 A1     Jun. 16, 2022

Related U.S. Application Data

(63) Continuation-in-part of application No. 17/469,381, filed on Sep. 8, 2021, now Pat. No. 11,954,703.

(51) Int. Cl.
*G06Q 30/00* (2023.01)
*G06Q 30/0242* (2023.01)
*G06Q 30/0251* (2023.01)
*G06Q 30/0273* (2023.01)

(52) U.S. Cl.
CPC ..... *G06Q 30/0275* (2013.01); *G06Q 30/0244* (2013.01); *G06Q 30/0246* (2013.01); *G06Q 30/0251* (2013.01)

(58) Field of Classification Search
None
See application file for complete search history.

(56) References Cited

U.S. PATENT DOCUMENTS

| 2009/0144159 | A1* | 6/2009 | Bashyam | H04N 7/17318 |
| | | | | 705/14.55 |
| 2010/0082392 | A1 | 4/2010 | Yang et al. | |
| 2016/0300265 | A1* | 10/2016 | Goyal | G06Q 30/0267 |
| 2019/0066152 | A1 | 2/2019 | Juhasz | |

FOREIGN PATENT DOCUMENTS

| CN | 108921613 A | 11/2018 |
| WO | 2006127645 A3 | 11/2006 |
| WO | 2007022137 A3 | 2/2007 |
| WO | 2008058289 A3 | 5/2008 |
| WO | 2011139913 A3 | 11/2011 |
| WO | 2011149997 A3 | 12/2011 |

* cited by examiner

*Primary Examiner* — Naresh Vig
(74) *Attorney, Agent, or Firm* — von Briesen & Roper, s.c.

(57) ABSTRACT

A computer implemented method includes allocating to an advertisement campaign, planned bookings for certain time periods and for certain digital displays from an Out Of Home inventory. The method also allocates, by a real-time bidding process, unplanned bookings to the time periods. Forecasts of unplanned bookings demand are taken into account in allocating planned bookings.

52 Claims, 2 Drawing Sheets

METHOD FOR DISPLAYING CONTENTS AND DIGITAL DISPLAY SYSTEM

CROSS-REFERENCE TO RELATED APPLICATIONS

This is a continuation in part of application under 35 U.S.C. § 121 claiming priority to U.S. patent application Ser. No. 17/469,381 filed on Sep. 8, 2021.

TECHNICAL FIELD

The present disclosure relates to methods and systems for displaying contents and digital display contents for Out Of Home (OOH) advertisement.

More particularly, the present disclosure concerns methods and systems for displaying contents on specific displays selected from an OOH inventory based on campaign features.

PRIOR ART

EP3564879A1 relates to a method and system for displaying contents from advertisement campaigns on displays belonging to an OOH inventory, by an artificial intelligence module which is run by allocation server and which is trained to optimally allocate displays and timing to advertisement campaigns.

The present disclosure aims to propose a still improved method and system for displaying contents, which is, inter alia, specially adapted to optimize allocation of the OOH inventory in the context of quickly and permanently changing advertisement of modern OOH systems.

OBJECTS

One object of the present disclosure is a computer implemented method for displaying contents from advertisement campaigns on digital displays belonging to an Out Of Home inventory, the computer implemented method including:
  providing to a computer system, campaign data for a set of at least one specific advertisement campaign;
  allocating to the set of at least one specific advertisement campaign, by said computer system, planned bookings for certain time periods and for digital displays of a specific set of digital displays from the Out Of Home inventory to fit the campaign data, for displaying contents from the set of at least one specific advertisement campaign on the digital displays of said specific set of digital displays during said time periods, said contents having durations respectively shorter than said time periods, at least some of the digital displays of said Out Of Home inventory having, at least for some time periods, an available share of time remaining for unplanned bookings;
  electronically dispatching to the specific set of digital displays, content data related to said contents from said set of at least one specific advertisement campaign;
  and playing said contents by said digital displays of said specific set of digital displays during said time periods,
wherein said computer system also selects, by a real-time bidding process, unplanned bookings for programmatic contents to fill-in at least partially said available share of time remaining for unplanned bookings,
wherein said computer system has forecasts of unplanned bookings demand, including the quantity of bids and the corresponding bid prices for the respective digital display of said Out Of Home inventory and the different time periods, and wherein said forecasts of unplanned bookings demand are taken into account by said computer system in allocating planned bookings for said set of at least one specific advertisement campaign.

In embodiments of the above method, one may further use one or several of the following features and any combination thereof:
  said computer system computes said forecasts of unplanned bookings demand based on real unplanned bookings demand gathered during said real-time bidding process;
  said real time bidding process is carried out by a Supply Side Platform belonging to the computer system and exchanging data with at least one Demand Side Platform;
  said computer system computes a contribution for a planned booking i corresponding to said set of at least one specific advertisement campaign for the respective digital displays of said Out Of Home inventory and at least some of the different time periods, said contribution being the difference $$P(i,j,t,x\_sot(i,j,t))-C(j,t,a(j,t),x\_sot(i,j,t)),$$

where $P(i,j,t,x\_sot(i,j,t))$ is the price of the planned booking i if played on digital display j in time period t with share of time $x\_sot$,
and $C(j,ta(j,t),x\_sot(i,j,t))$ is the cost of the lost opportunities on unplanned booking on digital display j in time period t with an available share of time $a(j,t)$ and an allocation of share of time $x\_sot(i,j,t)$ to planned bookings, $C(j,t,a(j,t),x\_sot(i,j,t))$ being computed based on said forecasts of unplanned bookings demand,
wherein said contribution is part of an objective function and wherein said computer system maximizes said objective function on the Out Of Home inventory;
  said objective function is a weighted sum of objectives, said contribution being one of said objectives;
  said objectives further include at least one of occupancy balancing, geographical spread, and one or more booking objectives imposed by said campaign data,
wherein booking objectives include at least audience objectives for the specific advertisement campaign and a number of digital displays displaying contents from said specific advertisement campaign;
  the occupancy balancing objective is the surplus available share of time $a\_sup(j,t)$ on digital display j for time period t after allocating the planned booking i, the surplus available share of time being computed only for digital displays having either an availability lower than a predetermined, non-zero limit A,
wherein said availability is:
  either an available share of time $a(j,t)$ on digital display j for time period t before allocating the planned booking i,
  or a forecast available share of time on digital display j for time period t;
  the geographical spread objective is a sum of integer decision variables $\Sigma$, where:
i designates the planned booking i,
said Out Of Home inventory is divided into local clusters of digital displays and k designates each cluster,
$z(i,k)$ is either equal to 0 if planned booking i is not allocated to any digital display of cluster k, or equal to a positive constant value if planned booking i is allocated to at least one digital display of cluster k;

when selecting unplanned bookings, said computer system determines, within each time period and for each digital display of said Out Of Home inventory, whether any additional unplanned booking can be accepted for immediate play while respecting the share of time of planned bookings allocated to said time period for said digital display;

to check whether any additional unplanned booking can be accepted for immediate play while respecting the share of time of planned bookings allocated to said time period for said digital display, the computer system computes, for each planned booking i, an on-schedule indicator $OSI(i,j,t,Te)=Ne(i,j,t)/(N(i,j,t)*Te/T)$, where:

T is the duration of the time period t,

Te is an elapsed time in time period t at the moment the content corresponding to the additional unplanned booking should be played, $N(i,j,t)$ is the total number of plays that have been allocated to planned booking i for digital display j and for time period t, $Ne(i,j,t)$ is the number of times planned booking i has been played by digital display j during time period t at elapsed time Te, wherein all bookings correspond to contents of same duration, and wherein the computer system authorizes said additional unplanned booking at elapsed time Te only if $OSI(i,j,t,Te)$ for each planned booking i is higher than a limit L;

said limit L is comprised between 0.8 and 1.2;

said computer system further compares a bidding price of said additional unplanned booking and a price of a next planned booking to be played in said time period, and said computer system orders:

playing said next planned booking by said digital display if the bidding price of said additional unplanned booking is lower than the price of said next planned booking;

playing said additional unplanned booking by said digital display if the bidding price of said additional unplanned booking is higher than the price of said next planned booking;

said computer system forms a first Supply Side Platform exchanging data with at least one Demand Side Platform, said real time bidding process is carried out by an ad exchange module belonging to the computer system and exchanging data with said at least one Demand Side Platform and with at least one additional Supply Side Platform;

at least one of said Supply Side Platforms has a guarantee that bookings (planned or unplanned) from said Supply Side Platform be allocated to at least one time period t on at least one digital display j of said Out Of Home inventory, wherein, when selecting bookings, said computer system either imposes bids or adapts priority of bids from said Supply Side Platform having said guarantee whenever necessary to respect said guarantee (the guarantee may be for instance a guaranteed share of time);

said Supply Side Platform having said guarantee, has a guaranteed share of time for said time period t and for said digital display j, wherein when choosing a bid for immediate play of a corresponding content while respecting said guarantee, the computer system computes an on-schedule indicator $OSI(s,j,t,Te)$ for said Supply Side Platform s having a guarantee, for said time period t and for said digital display j, wherein $OSI(s,j,t,Te)=Ne(s,j,t)/(N(s,j,t)*Te/T)$, where:

T is the duration of the time period t,

Te is an elapsed time in time period t at the moment the content corresponding to the chosen bid should be played, $N(s,j,t)$ is the total number of plays that have been allocated to Supply Side Platform s for digital display j and for time period t, $Ne(s,j,t)$ is the number of times a booking from said Supply Side Platform s has been played by digital display j during time period t at elapsed time Te, wherein all bookings correspond to contents of same duration, and wherein the computer system imposes selection of a bid from said Supply Side Platform having said guarantee at elapsed time Te if $OSI(s,j,t,Te)$ for said Supply Side Platform having said guarantee is lower than a limit L1;

several Supply Side Platforms s have a guaranteed share of time for said time period t and for said digital display j, wherein when choosing a bid for immediate play of a corresponding content while respecting said guarantee, the computer system computes said on-schedule indicator OSI $(s,j,t,Te)$ for each of said Supply Side Platforms s having a guaranteed share of time, for said at least one time period t and for said at least one digital display j, and wherein the computer system imposes selection of a bid from Supply Side Platform s0 at elapsed time Te if $OSI(s0,j,t,Te)$ for said Supply Side Platform having said guarantee is lower than said limit L1 and is lower than $OSI(s,j,t,Te)$ of all other Supply Side Platforms s having a guaranteed share of time for said time period t and for said digital display j;

said limit L1 is comprised between 0.8 and 1.2.

Another object of the present disclosure is a digital display system including a computer system and digital displays belonging to an Out Of Home inventory, wherein:

said computer system is adapted to allocate to a set of at least one specific advertisement campaign, planned bookings for certain time periods and for digital displays of a specific set of digital displays from the Out Of Home inventory to fit campaign data corresponding to said set of at least one specific advertisement campaign, for displaying contents from the set of at least one specific advertisement campaign on the digital displays of said specific set of digital displays during said time periods, said contents having durations respectively shorter than said time periods, at least some of the digital displays of said Out Of Home inventory having, at least for some time periods, an available share of time remaining for unplanned bookings;

said digital display system is adapted to electronically dispatch to the specific set of digital displays, content data related to said contents from said set of at least one specific advertisement campaign;

and said digital displays of said specific set of digital displays are adapted to play said contents during said time periods, wherein said computer system is also adapted to select, by a real-time bidding process, unplanned bookings for programmatic contents to fill-in at least partially said available share of time remaining for unplanned bookings, wherein said computer system has forecasts of unplanned bookings demand, including the quantity of bids and the corresponding bid prices for the respective digital display of said Out Of Home inventory and the different time periods, and wherein said computer system is adapted to take into account said forecasts of unplanned bookings demand in allocating planned bookings for said set of at least one specific advertisement campaign.

In embodiments of the above system, one may further use one or several of the following features and any combination thereof:

said computer system is adapted to compute said forecasts of unplanned bookings demand based on real unplanned bookings demand gathered during said real-time bidding process;

said real time bidding process is carried out by a Supply Side Platform belonging to the computer system and exchanging data with at least one Demand Side Platform;

said computer system computes a contribution for a planned booking i corresponding to said set of at least one specific advertisement campaign for the respective digital displays of said Out Of Home inventory and at least some of the different time periods, said contribution being the difference $$P(i,j,t,x\_sot(i,j,t))-C(j,t,a(j,t)x\_sot(i,j,t)),$$

where $P(i,j,t,x\_sot(i,j,t))$ is the price of the planned booking i if played on digital display j in time period t with share of time x_sot, and $C(j,t,a(j,t),x\_sot(i,j,t))$ is the cost of the lost opportunities on unplanned booking on digital display j in time period t with an available share of time $a(j,t)$ and an allocation of share of time $x\_sot(i,j,t)$ to planned booking i, $C(j,t,a(j,t), x\_sot(i,j,t))$ being computed based on said forecasts of unplanned bookings demand, wherein said contribution is part of an objective function and wherein said computer system is adapted to maximize said objective function on the Out Of Home inventory;

said objective function is a weighted sum of objectives, said contribution being one of said objectives;

said objectives further include at least one of occupancy balancing, geographical spread, and one or more booking objectives imposed by said campaign data, wherein booking objectives include at least one of audience objectives for the specific advertisement campaign and a number of digital displays displaying contents from said specific advertisement campaign;

the occupancy balancing objective is the surplus available share of time $a\_sup(j,t)$ on digital display j for time period t after allocating the planned booking i, the surplus available share of time being computed only for digital displays having:

either an availability lower than a predetermined, non-zero limit A, wherein said availability is either an available share of time $a(j,t)$ on digital display j for time period t before allocating the planned booking i, or a forecast available share of time on digital display j for time period t;

the geographical spread objective is a sum of integer decision variables $\Sigma$, where:

i designates the planned bookings, said Out Of Home inventory is divided into local clusters of digital displays and k designates each cluster, $z(i,k)$ is either equal to 0 if planned booking i is not allocated to any digital display of cluster k, or equal to a positive constant value if planned booking i is allocated to at least one digital display of cluster k;

when selecting unplanned bookings, said computer system is adapted to determine, within each time period and for each digital display of said Out Of Home inventory, whether any additional unplanned booking can be accepted for immediate play while respecting the share of time of planned bookings allocated to said time period for said digital display;

to check whether any additional unplanned booking can be accepted for immediate play while respecting the share of time of planned bookings allocated to said time period for said digital display, the computer system is adapted to compute, for planned booking i, an on-schedule indicator $OSI(i,j,t,Te)=Ne(i,j,t)/(N(i,j,t)*Te/T)$, where:

T is the duration of the time period t,

Te is an elapsed time in time period t at the moment the content corresponding to the additional unplanned booking should be played, $N(i,j,t)$ is the total number of plays that have been allocated to planned booking i for digital display j and for time period t, $Ne(i,j,t)$ is the number of times planned booking i has been played by digital display j during time period t at elapsed time Te, wherein all bookings correspond to contents of same duration, and wherein the computer system is adapted to authorize said additional unplanned booking at elapsed time Te only if $OSI(i,j,t,Te)$ for each planned booking i is higher than a limit L;

said limit L is comprised between 0.8 and 1.2;

said computer system is further adapted to compare a bidding price of said additional unplanned booking and a price of a next planned booking to be played in said time period, and said computer system is adapted to order:

playing of said next planned booking by said digital display if the bidding price of said additional unplanned booking is lower than the price of said next planned booking;

playing said additional unplanned booking by said digital display if the bidding price of said additional unplanned booking is higher than the price of said next planned booking;—said computer system forms a first Supply Side Platform exchanging data with at least one Demand Side Platform, said computer system has an ad exchange module adapted to carry out said real time bidding process by exchanging data with said at least one Demand Side Platform and with at least one additional Supply Side Platform;

at least one of said Supply Side Platforms has a guarantee that bookings from said Supply Side Platform be allocated to at least one time period t on at least one digital display j of said Out Of Home inventory, wherein, when selecting bookings, said computer system is adapted to either impose or restrict bids from said Supply Side Platform having said guarantee whenever necessary to respect said guarantee;

said Supply Side Platform having said guarantee, has a guaranteed share of time for said time period t and for said digital display j, wherein when choosing a bid for immediate play of a corresponding content while respecting said guarantee, the computer system is adapted to compute an on-schedule indicator $OSI(s,j,t,Te)$ for said Supply Side Platform s having a guarantee, for said time period t and for said digital display j, wherein $OSI(s,j,t,Te)=Ne(s,j,t)/(N(s,j,t)*Te/T)$, where:

T is the duration of the time period t,

Te is an elapsed time in time period t at the moment the content corresponding to the chosen bid should be played, N(s,j,t) is the total number of plays that have been allocated to Supply Side Platform s for digital display j and for time period t, Ne(s,j,t) is the number of times a booking from said Supply Side Platform s has been played by digital display j during time period t at elapsed time Te, wherein all bookings correspond to contents of same duration, and wherein the computer system is adapted to impose selection of a bid from said Supply Side Platform having said guarantee at elapsed time Te if OSI(s,j,t,Te) for said Supply Side Platform having said guarantee is lower than a limit L1;

several Supply Side Platforms s have a guaranteed share of time for said time period t and for said digital display j, wherein when choosing a bid for immediate play of a corresponding content while respecting said guarantee, the computer system is adapted to compute said on-schedule indicator OSI(s,j,t,Te) for each of said Supply Side Platforms s having a guaranteed share of time, for said time period t and for said digital display j, and wherein the computer system is adapted to impose selection of a bid from Supply Side Platform s0 at elapsed time Te if OSI(s0,j,t,Te) for said Supply Side Platform having said guarantee is lower than said limit L1 and is lower than OSI(s,j,t,Te) of all other Supply Side Platforms s having a guaranteed share of time for said time period t and for said digital display j;

said limit L1 is comprised between 0.8 and 1.2.

Still another object of the present disclosure is a computer implemented method for displaying contents from advertisement campaigns on digital displays belonging to an Out Of Home inventory, the computer implemented method including:

providing to a computer system, campaign data for a set of at least one specific advertisement campaign;

allocating to the set of at least one specific advertisement campaign, by said computer system, planned bookings for certain time periods and for digital displays of a specific set of digital displays from the Out Of Home inventory to fit the campaign data, for displaying contents from the set of at least one specific advertisement campaign on the digital displays of said specific set of digital displays during said time periods, said contents having durations respectively shorter than said time periods, at least some of the digital displays of said Out Of Home inventory having, at least for some time periods, an available share of time remaining for unplanned bookings;

electronically dispatching to the specific set of digital displays, content data related to said contents from said set of at least one specific advertisement campaign;

and playing said contents by said digital displays of said specific set of digital displays during said time periods, wherein said computer system also selects, by a real-time bidding process, unplanned bookings for programmatic contents to fill-in at least partially said available share of time remaining for unplanned bookings, and wherein, when selecting unplanned bookings, said computer system determines, within each time period and for each digital display of said Out Of Home inventory, whether any additional unplanned booking can be accepted for immediate play while respecting the share of time of planned bookings allocated to said time period for said digital display.

In embodiments of the above method, one may further use one or several of the following features and any combination thereof:

the computer system checks whether any additional unplanned booking can be accepted for immediate play while respecting the share of time of planned bookings allocated to said time period for said digital display, the computer system computes, for each planned booking i, an on-schedule indicator OSI(i,j,tTe)=Ne(i,j,t)/(N(i,j,t)*Te/T), where:

T is the duration of the time period t,

Te is an elapsed time in time period t at the moment the content corresponding to the additional unplanned booking should be played, N(i,j,t) is the total number of plays that have been allocated to planned booking i for digital display j and for time period t, Ne(i,j,t) is the number of times planned booking i has been played by digital display j during time period t at elapsed time Te, wherein all bookings correspond to contents of same duration, and wherein the computer system authorizes said additional unplanned booking at elapsed time Te only if OSI(i,j,t,Te) for each planned booking i is higher than a limit L;

said limit L is comprised between 0.8 and 1.2;

said computer system further compares a bidding price of said additional unplanned booking and a price of a next planned booking to be played in said time period, and said computer system orders:

playing said next planned booking by said digital display if the bidding price of said additional unplanned booking is lower than the price of said next planned booking;

playing said additional unplanned booking by said digital display if the bidding price of said additional unplanned booking is higher than the price of said next planned booking;—said computer system forms a first Supply Side Platform exchanging data with at least one Demand Side Platform, said real time bidding process is carried out by an ad exchange module belonging to the computer system and exchanging data with said at least one Demand Side Platform and with at least one additional Supply Side Platform;

at least one of said Supply Side Platforms has a guarantee that bookings from said Supply Side Platform be allocated to at least one time period t on at least one digital display j of said Out Of Home inventory, wherein, when selecting bookings, said computer system either imposes bids or adapts priority of bids from said Supply Side Platform having said guarantee whenever necessary to respect said guarantee;

said Supply Side Platform having said guarantee, has a guaranteed share of time for said time period t and for said digital display j, wherein when choosing a bid for immediate play of a corresponding content while respecting said guarantee, the computer system computes an on-schedule indicator OSI(s,j,t, Te) for said Supply Side Platform s having a guarantee, for said time period t and for said digital display j, wherein OSI(s,j,t,Te)=Ne(s,j,t)/(N(s,j,t)*Te/T), where:

T is the duration of the time period t,

Te is an elapsed time in time period t at the moment the content corresponding to the chosen bid should be played, N(s,j,t) is the total number of plays that have been allocated to Supply Side Platform s for digital display j and for time period t, Ne(s,j,t) is the number of times a booking from said Supply Side Platform s has been played by digital display j during time period t at elapsed time Te, wherein all bookings correspond to contents of same duration, and wherein the computer system imposes selection of a bid from said Supply Side Platform having said guarantee at elapsed time Te if OSI(s,j,t,Te) for said Supply Side Platform having said guarantee is lower than a limit L1;

several Supply Side Platforms s have a guaranteed share of time for said time period t and for said digital display j, wherein when choosing a bid for immediate play of a corresponding content while respecting said guarantee, the computer system computes said on-schedule indicator OSI(s,j,t,Te) for each of said Supply Side Platforms s having a guaranteed share of time, for said at least one time period t and for said at least one digital display j, and wherein the computer system imposes selection of a bid from Supply Side Platform s0 at elapsed time Te if OSI(s0,j,t,Te) for said Supply Side Platform having said guarantee is lower than said limit L1 and is lower than OSI(s,j,t,Te) of all other Supply Side Platforms s having a guaranteed share of time for said time period t and for said digital display j;

said limit L1 is comprised between 0.8 and 1.2.

Still another object of the present disclosure is a digital display system including a computer system and digital displays belonging to an Out Of Home inventory, wherein:

said computer system is adapted to allocate to a set of at least one specific advertisement campaign, planned bookings for certain time periods and for digital displays of a specific set of digital displays from the Out Of Home inventory to fit campaign data corresponding to said set of at least one specific advertisement campaign, for displaying contents from the set of at least one specific advertisement campaign on the digital displays of said specific set of digital displays during said time periods, said contents having durations respectively shorter than said time periods, at least some of the digital displays of said Out Of Home inventory having, at least for some time periods, an available share of time remaining for unplanned bookings;

said digital display system is adapted to electronically dispatch to the specific set of digital displays, content data related to said contents from said set of at least one specific advertisement campaign;

and said digital displays of said specific set of digital displays are adapted to play said contents during said time periods, wherein said computer system is also adapted to select, by a real-time bidding process, unplanned bookings for programmatic contents to fill-in at least partially said available share of time remaining for unplanned bookings, wherein said computer system has forecasts of unplanned bookings demand, including the quantity of bids and the corresponding bid prices for the respective digital display of said Out Of Home inventory and the different time periods, and wherein, when selecting unplanned bookings, said computer system is adapted to determine, within each time period and for each digital display of said Out Of Home inventory, whether any additional unplanned booking can be accepted for immediate play while respecting the share of time of planned bookings allocated to said time period for said digital display.

In embodiments of the above system, one may further use one or several of the following features and any combination thereof:

to check whether any additional unplanned booking can be accepted for immediate play while respecting the share of time of planned bookings allocated to said time period for said digital display, the computer system is adapted to compute, for each planned booking i, an on-schedule indicator OSI(i,j,t,Te)=Ne(i,j,t)/(N(i,j,t)*Te/T), where:

T is the duration of the time period t,

Te is an elapsed time in time period t at the moment the content corresponding to the additional unplanned booking should be played, N(i,j,t) is the total number of plays that have been allocated to planned booking i has been played for digital display j and for time period t, Ne(i,j,t) is the number of times planned booking i has been played by digital display j during time period t at elapsed time Te, wherein all bookings correspond to contents of same duration, and wherein the computer system is adapted to authorize said additional unplanned booking at elapsed time Te only if OSI(i,j,t,Te) for each planned booking i is higher than a limit L;

said limit L is comprised between 0.8 and 1.2;

said computer system is further adapted to compare a bidding price of said additional unplanned booking and a price of a next planned booking to be played in said time period, and said computer system is adapted to order:

playing of said next planned booking by said digital display if the bidding price of said additional unplanned booking is lower than the price of said next planned booking;

playing said additional unplanned booking by said digital display if the bidding price of said additional unplanned booking is higher than the price of said next planned booking;—said computer system forms a first Supply Side Platform exchanging data with at least one Demand Side Platform, said computer system has an ad exchange module adapted to carry out said real time bidding process by exchanging data said at least one Demand Side Platform and with at least one additional Supply Side Platform;

at least one of said Supply Side Platforms has a guarantee that bookings from said Supply Side Platform be allocated to at least one time period t on at least one digital display j of said Out Of Home inventory, wherein, when selecting bookings, said computer system either is adapted to impose or restrict bids from said Supply Side Platform having said guarantee whenever necessary to respect said guarantee;

said Supply Side Platform having said guarantee, has a guaranteed share of time for said time period t and for said digital display j, wherein when choosing a bid for immediate play of a corresponding content while respecting said guarantee, the computer system is adapted to compute an on-schedule indicator OSI(s,j,t,Te) for said Supply Side Platform s having a guarantee, for said time period t and for said digital display j, wherein OSI(s,j,t,Te)=Ne(s,j,t)/(N(s,j,t)*Te/T), where:

s designates said Supply Side Platform having a guarantee,

T is the duration of the time period t,

Te is an elapsed time in time period t at the moment the content corresponding to the chosen bid should be played, N(s,j,t) is the total number of plays that have been allocated to Supply Side Platform s for digital display j and for time period t, Ne(s,j,t) is the number of times a booking from said Supply Side Platform s has been played by digital display j during time period t at elapsed time Te, wherein all bookings correspond to contents of same duration, and wherein the computer system is adapted to impose selection of a bid from said Supply Side Platform having said guarantee at elapsed time Te if OSI(s,j,t,Te) for said Supply Side Platform having said guarantee is lower than a limit L1;

several Supply Side Platforms s have a guaranteed share of time for said time period t and for said digital display j, wherein when choosing a bid for immediate play of a corresponding content while respecting said guarantee, the computer system is adapted to compute said on-schedule indicator OSI(s,j,t,Te) for each of said Supply Side Platforms s having a guaranteed share of time, for said at least one time period t and for said at least one digital display j, and wherein the computer system is adapted to impose selection of a bid from Supply Side Platform s0 at elapsed time Te if OSI(s0,j,t,Te) for said Supply Side Platform having said guarantee is lower than said limit L1 and is lower than OSI(s,j,t,Te) of all other Supply Side Platforms s having a guaranteed share of time for said time period t and for said digital display j;

said limit L1 is comprised between 0.8 and 1.2.

BRIEF DESCRIPTION OF THE DRAWINGS

Other features and advantages will appear from the following description of one embodiment, given by way of non-limiting example, with regard to the drawings.

In the drawings.

MORE DETAILED DESCRIPTION

Figure 1:
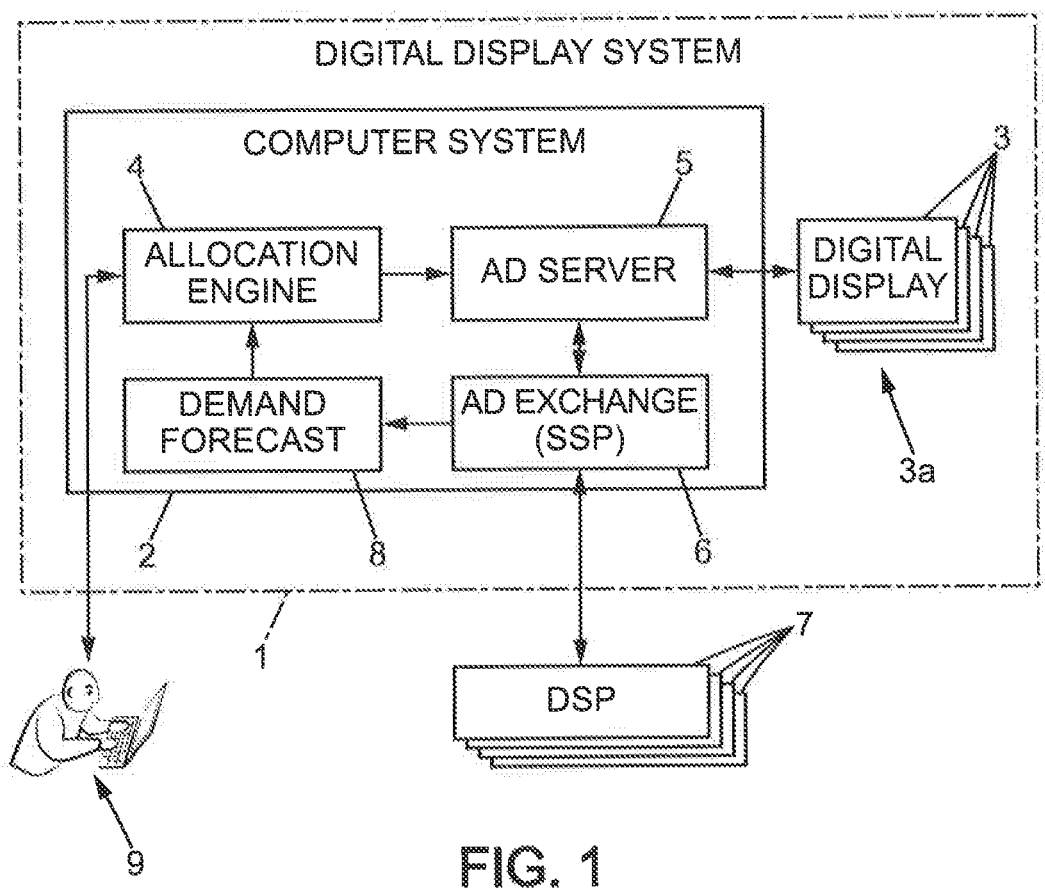
FIG. 1 is a block diagram showing a digital display system according to one embodiment.

FIG. 1 shows an Out Of Home (OOH) digital display system 1.

The digital display system 1 includes a computer system 2 and digital displays 3.

The computer system 2 may be usually a server or a set of servers, for instance cloud-based server(s).

The digital displays 3 are spread in a geographical area which can be as large as worldwide, or a country, a region, a town, etc. The digital displays 3 may belong to clusters corresponding to various local areas in said geographical area. The whole set of digital displays 3 forms an OOH inventory 3a.

Each digital display 3 may include a player (i.e. a computer having a processor and a memory) controlling an electronic screen such as an LED electronic screen, an LCD electronic screen or any other type of known electronically addressable screen. The contents played by the player may be images, movies, web pages or any other type of digital content which may be displayed on the electronic screen.

The computer system 2 includes several software modules:

an allocation engine 4;
an ad server 5;
an ad exchange module 6, in this case also playing the role of a Supply Side Platform (SSP)—or more generally, computer system 2 forms a Supply Side Platform;
a demand forecast module 8.

Allocation engine 4 is programmed to receive campaign data from user devices 9 regarding advertisement campaigns. The user devices may be computer workstations used by operators dedicated to the digital display system 1 or used by clients.

Allocation engine 4 may also receive campaign data from the ad exchange module 6 or another automatic bidding system. Such campaign data concern programmatic guaranteed bookings, i.e. bookings which are planned in advance before playing the corresponding contents. "in advance" means here for instance at least one hour in advance, frequently several days in advance. The bookings corresponding to campaign data received from user devices 9 and from exchange module 6 or another automatic bidding system are called altogether "planned bookings" (or "guaranteed demand").

The campaign data may include for instance:

references of contents to be played by digital displays 3 (e.g. respective addresses of the contents, for instance html addresses), or the contents themselves;

campaign objectives, for instance:

audience (usually number of potential views—i.e. impressions—by persons of the public, possibly segmented by audience categories);

geographical location of the digital displays 3 to be used;

timing for playing the contents;

number of digital displays 3 to be used, etc.

Thus, an advertisement campaign is composed of at least one content to be played on digital displays, plus campaign objectives.

When allocation engine 4 receives a set of at least one specific advertisement campaign to allocate (for instance one campaign), said allocation engine 4 allocates to this set of at least one specific advertisement campaign, allocation engine allocates planned bookings corresponding to this set of specific advertisement campaigns, to certain time periods and a specific set of said digital displays from the OOH inventory 3a to fit the campaign data.

Each (unitary) planned booking is thus a reservation made to play at least one content of a specific advertisement campaign (either one specific content from the specific advertisement campaign, or a set of contents from which one content may be played e.g. depending upon certain conditions, for instance weather conditions or other) during a to certain time period on a specific digital display from the OOH inventory 3a. Effectively playing (i.e. displaying) the content of the booking on a digital display will be referred to here, by extension, as "playing the booking" or "a play of the booking".

Said time periods may be usually of one hour (for instance 04/08/2021, 1 pm to 2 pm), but different time periods can be used. Usually all contents have a same unitary duration (for instance 10 s, or a different value) or possibly an integer multiple of said unitary duration. The time period is an integer multiple of the unitary duration. The unitary duration can also be called unitary time slot.

Allocation engine 4 does not fix the exact time of play of each allocated content of the specific set of at least one specific advertisement campaign on each digital display 3: allocation engine determines a share of time x_sot for the allocated content of the set i of at least one specific campaign to be played on digital display j in time period t.

This allocation can be made in various ways, some of which are known in the art.

According to the present disclosure, allocation can be made by maximizing (more generally optimizing) an objective function on the whole OOH inventory, in order to maximize the global revenue from the OOH inventory. In other words, allocation engine 4 determines the values of share of time x_sot(i,j,t) of planned booking I corresponding to each set of at least one specific advertisement campaign on the digital displays j during time periods t, which maximizes (respectively optimizes) the objective function.

Such maximization can be made for instance by a Mixed Integer Program (MIP) optimization model run by the allocation engine 4. The objective function may be a weighted function of several objectives.

In one embodiment, allocation engine 4 does not solve itself the maximization problem but uses an external solver software which is commercially available. In that case, the allocation engine may be developed using a microservice to receive and respond to requests in a fixed format.

The objective function is made to allocate the planned bookings in a way which also enables optimal use of programmatic unplanned bookings, in the available share of time which is not used by planned bookings.

Once the allocation is made by allocation engine 4 and each time the allocation is modified, it is transmitted by allocation engine 4 to ad server 5. Ad server 5 may compute playlists for each digital display 3 and each time period. The playlists may contain the order of play of the contents to be played by each digital display during the time period, and content data relative to these contents. The playlists are electronically dispatched to the digital displays shortly before each time period or even during the time periods in case of modifications of the playlists during the corresponding time period. This electronic dispatching may be made by having each digital display 3 regularly sending requests to ad server 5 to determine whether a playlist concerning this digital display has to be downloaded from the ad server.

The content data contained in the playlists can include only references of the contents, and the ad server may also compute for each digital display 3 a manifest containing references of the contents and addresses from where the digital display has to download the corresponding contents.

Based on information received from ad server 5, each digital display 3 plays the contents determined by ad server 5 during the corresponding time periods.

Computer system 2 also selects, by a real-time bidding process, unplanned bookings for programmatic contents to fill-in at least partially said available share of time remaining for unplanned bookings in each time period for each digital display 3.

This is done through ad exchange module 6, communicating with ad server 5. Ad exchange module 6 also communicates, externally of the computer system 2, with one or more Demand Side Platform 7 (DSP) to send calls for bids to Demand Side Platform(s) 7 and receive from Demand Side Platform(s) 7 bids for programmatic unplanned bookings. The best bids are retained as unplanned bookings and the data related to corresponding contents to be played are inserted by ad server 5 in the playlists or in the playlists and manifests of the corresponding digital displays 3 for the corresponding time periods.

Similarly to planned bookings, each unplanned booking is thus a reservation made by the bidding process to play at least one content (either one specific content, or a set of contents from which one content may be played e.g. depending upon certain conditions, for instance weather conditions or other) during a certain time period (and usually more precisely during a certain time slot of that time period) on a specific digital display from the OOH inventory 3a. As explained above, effectively playing (i.e. displaying) the content of the booking on a digital display will be referred to here, by extension, as "playing the booking" or "a play of the booking".

Demand forecast module 8 has forecasts of unplanned bookings demand, including the quantity of bids and the corresponding bid prices for the respective digital display of said Out Of Home inventory and the different time periods. Demand forecast module 8 communicates with ad server 5 and allocation engine 4.

Demand forecast module 8 may compute said forecasts based on the history of bids received by ad exchange module 6. To this end, demand forecast module 8 may use for instance known time series models.

Figure 2:
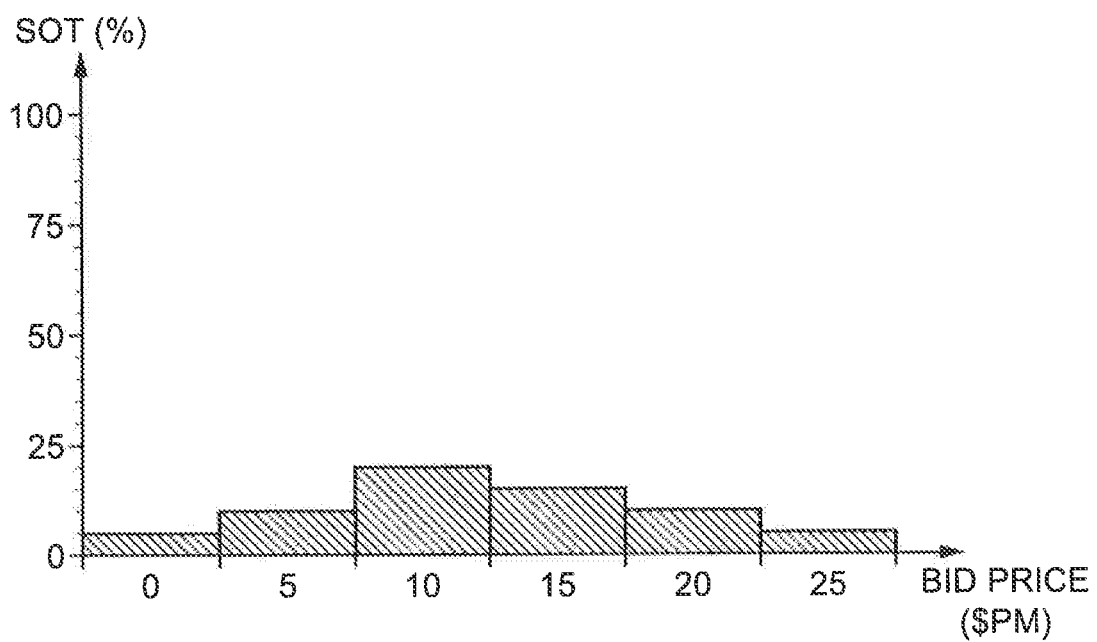
FIG. 2 is a histogram of forecast bids for a particular time period and a particular digital display diagram showing physical components in an example of system for displaying contents.

The output of demand forecast module may include, for each digital display 3 of the OOH inventory and for each time period, a bid histogram or any similar data representing the distribution of forecasted bids with the forecasted number of bids distributed by bid price, as represented on FIG. 2. The bid prices may be expressed in price per mille (PM), e.g. $PM, i.e. price per 1000 impressions. Demand forecast module 8 or allocation engine 4, or any other module of the computer system 2, is adapted to transform such price per mille into actual price of the bid, knowing the number of impressions associated to the corresponding digital display 3 and to the corresponding time period. The number of impressions associated with the corresponding digital display 3 and to the corresponding time period are memorized in computer system 2, based on statistical data and/or on actual measurements of the audience close to each digital display 3, as it is known in the art.

The output of demand forecast module 8 may also include a forecast of the total planned bookings of each digital display 3 and each time period when the digital display 3 is at time of displaying the contents or when the display 3 as at time of auction for unplanned bookings (e.g. starting from a few minutes before the beginning of the considered time period).

As it will be explained in more details below, said forecasts of unplanned bookings demand are taken into account by allocation engine 4 in allocating planned bookings for a new set of at least one specific advertisement campaign to be allocated.

To this end, allocation engine 4 may compute, for each planned booking corresponding to a new set of at least one specific advertisement campaign, a contribution for said planned booking for the respective digital displays of said Out Of Home inventory and at least some of the different time periods.

Said contribution is the difference OC $(i,j,t) = P(i,j,t,x\_sot(i,j,t)) - C(j,t,a(j,t),x\_sot(i,j,t))$ where:

$P(i,j,t,x\_sot(i,j,t))$ is the price of the planned booking i if played on digital display j in time period t with share of time x_sot; and $C(j,ta(j,t),x\_sot(i,j,t))$ is the cost of the lost opportunities on unplanned booking on digital display j in time period t with an available share of time a(j,t) and an allocation of share of time x_sot(i,j,t) to planned booking i, C(j,t,a(j,t), x_sot(i,j,t)) being computed based on said forecasts of unplanned bookings demand.

The cost of lost opportunities C(j,t,a(j,t),x_sot(i,j,t)) may be computed using the distribution of forecasted bids for unplanned bookings as described above.

For instance, based on the available share of time a(j,t) of digital display j for time period t, allocation engine 4 may compute the quantity of bids of each bid price which is necessary to fill this available share of time a(j,t), starting from the least expensive bids and going up in bid prices to the point where the total share of time of these forecasted bids reach the available share of time a(j,t). For instance, in the example of FIG. 2, let us suppose the forecasted distribution for digital display j and time period t is:

| Bid price ($PM) | SOT (%) |
|---|---|
| 0 | 5 |
| 5 | 10 |
| 10 | 20 |
| 15 | 15 |
| 20 | 10 |
| 25 | 5 |

If a(j,t)=35%, it means the digital display j during time period t has availability for all the forecasted bids at 15$PM, 20$PM and 25 $PM.

Then, the cost of lost opportunities when allocating planned booking i to the time period t of digital display j, is the weighted average of canceling the quantity of share of time x_sot(i,j,t) among the forecasted bid distribution available for a(j,t), starting from the lower bid prices.

So, in the above example, if x_sot(i,j,t)=15%, then allocating x_sot(i,j,t) to the planned booking i means canceling availability for the 15% of share of time of forecasted bids at 15 $PM and the cost of lost opportunities is 15 $PM*IMP (j,t)/1000, where IMP(j,t) is the number of impressions corresponding to j and t. For instance, if the number of impressions IMP(j,t) is 1000, the cost of lost opportunities is 15 $.

In the same above example, if x_sot(i,j,t)=20%, then allocating x_sot(i,j,t) to planned booking i means canceling availability for the 15% of share of time of forecasted bids at 15 $PM and 5% of share of time of forecasted bids at 20 $PM, so the cost of lost opportunities is ((15 $PM*15+20 $PM*5)/20)*IMP (j,t)/1000, so 16.25 $PM*IMP (j,t)/1000.

When the price received for planned booking i P(i,j,t, x_sot(i,j,t)) is higher than the cost of lost opportunity of unplanned booking C(j,t,a(j,t),x_sot(i,j,t)), the contribution IC(i,j, t) is positive and the media owner has an interest to accept the planned booking i.

In the contrary case, the contribution IC(i,j,t) is negative and the media owner has an interest not to accept the planned booking i and it may mean that the price of planned booking is not high enough.

The contribution IC(i,j,t) may be at least part of the objective function maximized by allocation engine 4.

In one embodiment, said contribution IC(i,j,t) can constitute said objective function.

In other embodiments, said objective function is a weighted sum of objectives, and said contribution may be one of said objectives. In that case, said objectives may include at least one of contribution, occupancy balancing, geographical spread, and one or more booking objectives imposed by said campaign data. Said booking objectives may include at least one of audience objectives for the specific advertisement campaign and a number of digital displays displaying contents from said specific advertisement campaign.

When the objective function OF is a weighted function of several objectives $O_1, O_2, \ldots O_n$, OF can be in the form: $\Sigma$, wherein:
$A_p$ is a weighting coefficient representing the importance of objective $O_p$;
$B_p$ is a normalizing coefficient for objective $O_p$, for instance $B_p$ may be an average value or a maximum value of objective $O_p$.

As an example, if the objectives $O_p$ are by decreasing importance, the weighting coefficients $A_p$ may be sharply decreasing with index p, for instance A1=25, A2=10, A3=2, etc.

The occupancy balancing objective is the surplus available share of time a_sup(j,t) on digital display j for time period t after said allocating the booking i, the surplus available share of time being computed only for digital displays j having:
either an availability lower than a predetermined, non-zero limit A, wherein said availability is either an available share of time a(j,t) on digital display j for time period t before said allocating to the planned booking i,
or a forecast available share of time on digital display j for time period t.

The geographical spread objective is a sum of integer decision variables $\Sigma$, where:
i designates the planned booking,
said Out Of Home inventory is divided into local clusters of digital displays and k designates each cluster,
z(i,k) is either equal to 0 if no planned booking for said set of at least one specific advertisement campaign is allocated to any digital display of cluster k, or equal to a positive constant value if at least one planned booking for said set of at least one specific advertisement campaign is allocated to at least one digital display of cluster k.

When selecting unplanned bookings, computer system 2, and more specially ad server 5, determines, within each time period t and for each digital display 3 of the Out Of Home inventory 3a, whether any additional unplanned booking can be accepted for immediate play while respecting the share of time of planned bookings allocated to said time period for said digital display.

To check whether any additional unplanned booking can be accepted for immediate play while respecting the share of time of planned bookings allocated to said time period t for said digital display j, the computer system computes, for each planned booking i, an on-schedule indicator OSI(i,j,t, Te)=Ne(i,j,t)/(N(i,j,t)*Te/T), where:
T is the duration of the time period t,
Te is an elapsed time in time period t at the moment the content corresponding to the additional unplanned booking should be played,
N(i,j,t) is the total number of plays that have been allocated to booking i for digital display j and for time period t,
Ne(i,j,t) is the number of times booking i has been played by digital display j during time period t at elapsed time Te, and the ad server 5 authorizes said additional unplanned booking at elapsed time Te only if OSI(i,j,t,Te) for each content corresponding to a planned booking is higher than a limit L.

N(i,j,t) is computed from the share of time x_sot(i,j,t). For instance, if a planned booking has a 20% share of time allocated for a time period t of one hour and each play lasts 10 seconds, then N(i,j,t)=72.

If a planned booking has its OSI(i,j,t,Te) lower than L, then the corresponding content is played in the next timeslot.

If several planned bookings have their OSI(i,j,t,Te) lower than L, then the content corresponding to the booking of minimal OSI(i,j,t,Te) is played in the next timeslot.

Said limit L can be any positive value but is typically set to or near 1 which is the value of OSI if on track. Said limit L may be for instance comprised between 0.8 and 1.2, more especially between 0.8 and 1, for example between 0.9 and 1. In a particular example, L=0.95. The limit L may be a constant.

The ad server 5 further compares the bidding price of said additional unplanned booking and the price of a next planned booking to be played in said time period, and said ad server 5 orders:
- playing said next planned booking by said digital display if the bidding price of said additional unplanned booking is lower than (or possibly equal to) the price of said next planned booking;
- playing said additional unplanned booking by said digital display j if the bidding price of said additional unplanned booking is higher than the price of said next planned booking.

Figure 3:
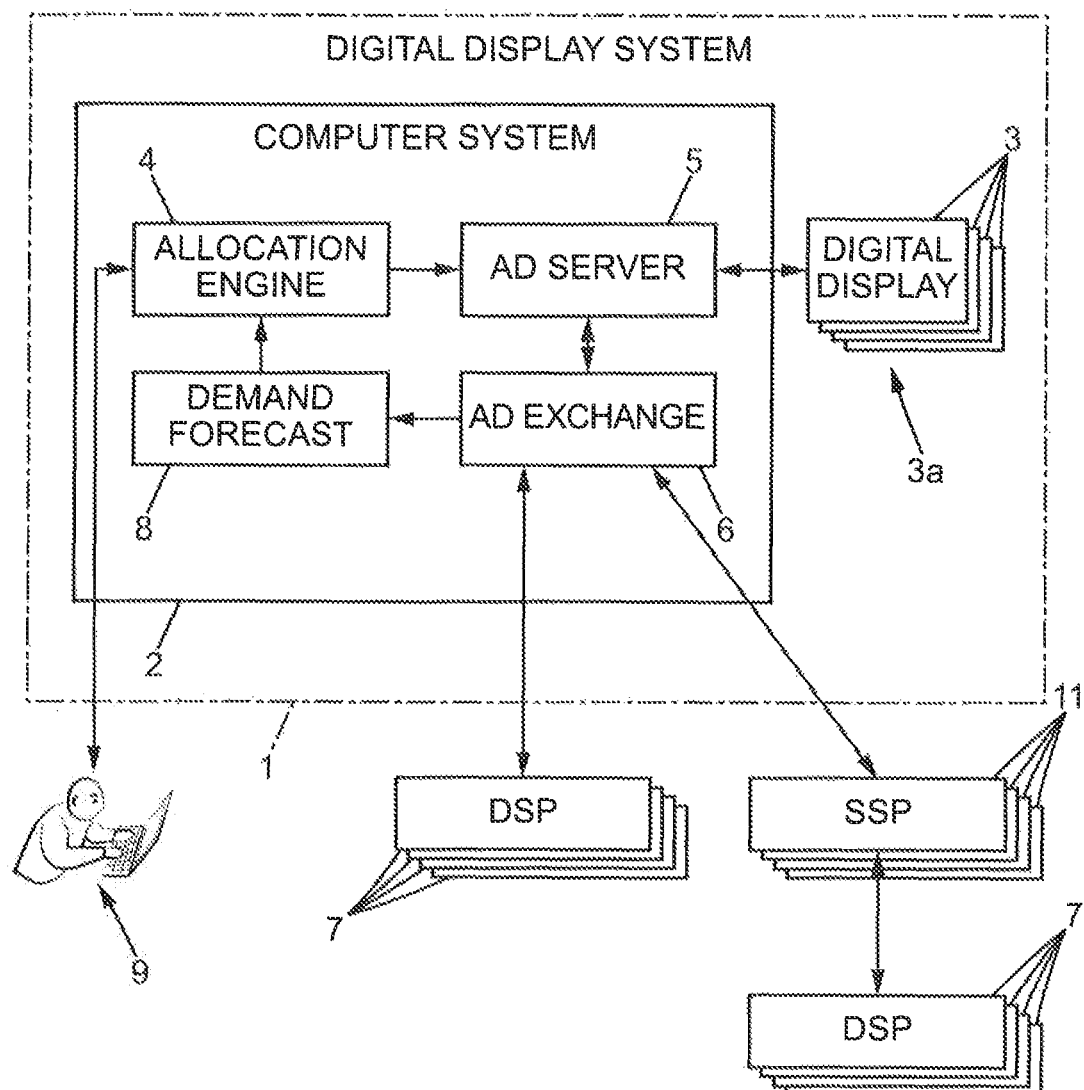
FIG. 3 is a block diagram showing a digital display system according to another embodiment.

The embodiment of FIG. 3 is similar to that of FIG. 1 and will not be described in detail again. Only the particulars of the embodiment of FIG. 3 will be explained below and all previous explanations given with regard to FIGS. 1 and 2 are applicable here provided they are not contradicted by the description below.

The embodiment of FIG. 3 differs from that of FIG. 1 in that the ad exchange module 6 carries out the real time bidding process either by exchanging data directly with at least one Demand Side Platform 7 (DSP) as described above, or by exchanging data with one or several additional Supply Side Platforms 11 (SSP), each additional Supply Side Platform 11 being adapted to exchange data with at least one Demand Side Platform 7 (DSP).

Thus, computer system 2 forms a first Supply Side Platform exchanging data with said at least one Demand Side Platform 7 through the ad exchange module 6, and also communicates with said at least one Supply Side Platform 11 may include at least one Supply Side Platform 11 external to the computer system 2.

During the bidding process used to select an unplanned booking, ad exchange module 6 receives bids directly from Demand Side Platform 7 (DSP) as described above, and through one or several Supply Side Platforms 11, among those which are eligible for the digital display j and the time period t concerned.

The ad server 5 may determine a list of eligible unplanned bookings from the Demand Side Platforms 7 communicating directly with ad exchange server 6, and a list of eligible Supply Side Platforms 11, based on digital display j, on time period t, and possible other criteria such as targeting of bookings and Supply Side Platforms deal/SSP, ensuring that business rules are honored such as competitive ads or the same ad do not play consecutively on digital display j.

Computer system 2 and in particular ad server 5 may compute on schedule indicators (OSI) for planned bookings (i.e. "manual" bookings and programmatic guaranteed bookings) as explained above.

In the present embodiment, at least one of said Supply Side Platforms 2, 11 may have a guarantee that planned and unplanned bookings from said Supply Side Platform be selected for a time period t and for a digital display j of the Out Of Home inventory.

For instance, the Supply Side Platform 2, 11 in question may have a guaranteed share of time (also called allotment) for time period t on digital display j. The Supply Side Platform 2, 11 in question may alternatively have a guaranteed number of impressions for time period t on digital display j, but this also corresponds to a share of time, knowing the number of impressions associated to digital display j and to time period t, as explained above.

In case a Supply Side Platform 2, 11 has a guarantee, when selecting unplanned bookings, computer system 2 (e.g. ad exchange module 6) is adapted to either impose bids or adapt priority of bids from said Supply Side Platform s having said guarantee whenever necessary to respect said guarantee. To adapt priority, computer system 2 may restrict bids from occurring or may de-prioritize these bids if needed to satisfy another guarantee. It will prioritize (or impose) bids if needed for a particular guarantee.

When the guarantee is a guaranteed share of time for time period t and digital display j, when choosing a bid for immediate play of a corresponding content while respecting said guarantee, computer system 2 is adapted to compute an on-schedule indicator OSI(s,j,t,Te) for Supply Side Platform s, for said time period t and for said digital display j.

Said on-schedule indicator may be OSI(s,j,t,Te)=Ne(s,j,t)/(N(s,j,t)*Te/T), where:
- T is the duration of the time period t,
- Te is an elapsed time in time period t at the moment the content corresponding to the chosen bid should be played,
- N(s,j,t) is the total number of plays that have been allocated to Supply Side Platform s for digital display j and for time period t,
- Ne(s,j,t) is the number of times a booking from said Supply Side Platform s has been played by digital display j during time period t at elapsed time Te.

Computer system 2 is adapted to impose selection of a bid from said Supply Side Platform s having said guarantee at elapsed time Te if OSI(s,j,t,Te) for said Supply Side Platform having said guarantee is lower than a limit L1.

In case several Supply Side Platforms s have a guaranteed share of time for said time period t and for said digital display j, when choosing a bid for immediate play of a corresponding content while respecting said guarantee, computer system 2 is adapted to compute said on-schedule indicator OSI(s,j,t,Te) for each of said Supply Side Platforms s having a guaranteed share of time, for time period t and for said at least one digital display j.

Computer system 2 is adapted to impose selection of a bid from Supply Side Platform s0 at elapsed time Te if OSI(s0,j,t,Te) for said Supply Side Platform having said guarantee is lower than said limit L1 and is lower than OSI(s,j,t,Te) of all other Supply Side Platforms s having a guaranteed share of time for said time period t and for said digital display j.

Said limit L1 can be any positive value but is typically set to or near 1 which is the value of OSI if on track. For instance, L1 may be comprised between 0.8 and 1.2 (the values described for limit L are applicable here). L1 may be a constant.

Ad exchange module may select the ad to be played next on digital display j during time period t for instance as follows:
- If any of the guaranteed Supply Side Platforms among SSPs 2, 11 has an OSI below threshold L1, then the Supply Side Platform with the lowest OSI will be selected regardless of bid price or order of response;
- If there is a guaranteed booking with OSI below threshold L, then the guaranteed booking with the lowest OSI will be selected regardless of bid price or order of response;
- In case there is at least one preferred non-guaranteed booking or SSP, then the highest bidder is selected amongst them (or first responder in case of a tie);
- Otherwise a normal auction is conducted and the highest bidder is selected. If no Supply Side platform has no guarantee, it will be treated as any unplanned demand and the bidding value it puts forward will be selected if higher than any other bidders (so long that all OSI values are above the limits L, L1).

The invention claimed is:

1. A computer implemented method for displaying contents from advertisement campaigns on digital displays belonging to an Out Of Home inventory, the computer implemented method including:
providing to a computer system, campaign data for a set of at least one specific advertisement campaign;
allocating to the set of at least one specific advertisement campaign, by said computer system, planned bookings for certain time periods and for digital displays of a specific set of digital displays from the Out Of Home inventory to fit the campaign data, for displaying contents from the set of at least one specific advertisement campaign on the digital displays of said specific set of digital displays during said time periods, said contents having durations respectively shorter than said time periods, at least some of the digital displays of said Out Of Home inventory having, at least for some time periods, an available share of time remaining for unplanned bookings;
electronically dispatching to the specific set of digital displays, content data related to said contents from said set of at least one specific advertisement campaign;
and playing said contents by said digital displays of said specific set of digital displays during said time periods,
wherein said computer system also selects, by a real-time bidding process, unplanned bookings for programmatic contents to fill-in at least partially said available share of time remaining for unplanned bookings,
wherein said computer system has forecasts of unplanned bookings demand, including the quantity of bids and the corresponding bid prices for the respective digital display of said Out Of Home inventory and the different time periods, and wherein said forecasts of unplanned bookings demand are taken into account by said computer system in allocating planned bookings for said set of at least one specific advertisement campaign.

2. The computer implemented method of claim 1, wherein said computer system computes said forecasts of unplanned bookings demand based on real unplanned bookings demand gathered during said real-time bidding process.

3. The computer implemented method of claim 1, wherein said real time bidding process is carried out by a Supply Side Platform belonging to the computer system and exchanging data with at least one Demand Side Platform.

4. The computer implemented method of claim 1, wherein said computer system computes a contribution for a planned booking i corresponding to said set of at least one specific advertisement campaign for the respective digital displays of said Out Of Home inventory and at least some of the different time periods, said contribution being the difference $$P(i,j,t,x\_sot(i,j,t))-C(j,t,a(j,t),x\_sot(i,j,t)),$$

where $P(i,j,t,x\_sot(i,j,t))$ is the price of the planned booking i if played on digital display j in time period t with share of time x_sot,
and $C(j,t,a(j,t),x\_sot(i,j,t))$ is the cost of the lost opportunities on unplanned booking on digital display j in time period t with an available share of time $a(j,t)$ and an allocation of share of time $x\_sot(i,j,t)$ to planned booking i, $C(j,t,a(j,t),x\_sot(i,j,t))$ being computed based on said forecasts of unplanned bookings demand,
wherein said contribution is part of an objective function and wherein said computer system maximizes said objective function on the Out Of Home inventory.

5. The computer implemented method of claim 1, wherein said objective function is a weighted sum of objectives, said contribution being one of said objectives.

6. The computer implemented method of claim 5, wherein said objectives further include at least one of occupancy balancing, geographical spread, and one or more booking objectives imposed by said campaign data,
wherein booking objectives include at least one of audience objectives for the specific advertisement campaign and a number of digital displays displaying contents from said specific advertisement campaign.

7. The computer implemented method of claim 6, wherein the occupancy balancing objective is the surplus available share of time $a\_sup(j,t)$ on digital display j for time period t after allocating the planned booking i, the surplus available share of time being computed only for digital displays having:
either an availability lower than a predetermined, non-zero limit A, wherein said availability is either an available share of time $a(j,t)$ on digital display j for time period t before allocating the planned booking i,
or a forecast available share of time on digital display j for time period t.

8. The computer implemented method of claim 6, wherein the geographical spread objective is a sum of integer decision variables $\Sigma_k z(i,k)$, where:
i designates the planned booking,
said Out Of Home inventory is divided into local clusters of digital displays and k designates each cluster,
$z(i,k)$ is either equal to 0 if planned booking i is not allocated to any digital display of cluster k, or equal to a positive constant value if planned booking i is allocated to at least one digital display of cluster k.

9. The computer implemented method of claim 1, wherein, when selecting unplanned bookings, said computer system determines, within each time period and for each digital display of said Out Of Home inventory, whether any additional unplanned booking can be accepted for immediate play while respecting the share of time of planned bookings allocated to said time period for said digital display.

10. The computer implemented method of claim 9, wherein to check whether any additional unplanned booking can be accepted for immediate play while respecting the share of time of planned bookings allocated to said time period for said digital display, the computer system computes, for each planned booking i, an on-schedule indicator $OSI(i,j,t,Te)=Ne(i,j,t)/(N(i,j,t)*Te/T)$, where:

T is the duration of the time period t,

Te is an elapsed time in time period t at the moment the content corresponding to the additional unplanned booking should be played, N(i,j,t) is the total number of plays that have been allocated to planned booking i for digital display j and for time period t, Ne(i,j,t) is the number of times planned booking i has been played by digital display j during time period t at elapsed time Te, wherein all bookings correspond to contents of same duration, and wherein the computer system authorizes said additional unplanned booking at elapsed time Te only if OSI(i,j,t,Te) for each planned booking i is higher than a limit L.

11. The computer implemented method of claim 10, wherein said limit L is comprised between 0.8 and 1.2.

12. The computer implemented method of claim 9, wherein said computer system further compares a bidding price of said additional unplanned booking and a price of a next planned booking to be played in said time period, and said computer system orders:

playing said next planned booking by said digital display if the bidding price of said additional unplanned booking is lower than the price of said next planned booking;

playing said additional unplanned booking by said digital display if the bidding price of said additional unplanned booking is higher than the price of said next planned booking.

13. A digital display system including a computer system and digital displays belonging to an Out Of Home inventory, wherein:

said computer system is adapted to allocate to a set of at least one specific advertisement campaign, planned bookings for certain time periods and for digital displays of a specific set of digital displays from the Out Of Home inventory to fit campaign data corresponding to said set of at least one specific advertisement campaign, for displaying contents from the set of at least one specific advertisement campaign on the digital displays of said specific set of digital displays during said time periods, said contents having durations respectively shorter than said time periods, at least some of the digital displays of said Out Of Home inventory having, at least for some time periods, an available share of time remaining for unplanned bookings;

said digital display system is adapted to electronically dispatch to the specific set of digital displays, content data related to said contents from said set of at least one specific advertisement campaign;

and said digital displays of said specific set of digital displays are adapted to play said contents during said time periods, wherein said computer system is also adapted to select, by a real-time bidding process, unplanned bookings for programmatic contents to fill-in at least partially said available share of time remaining for unplanned bookings, wherein said computer system has forecasts of unplanned bookings demand, including the quantity of bids and the corresponding bid prices for the respective digital display of said Out Of Home inventory and the different time periods, and wherein said computer system is adapted to take into account said forecasts of unplanned bookings demand in allocating planned bookings for said set of at least one specific advertisement campaign.

14. The digital display system of claim 13, wherein said computer system is adapted to compute said forecasts of unplanned bookings demand based on real unplanned bookings demand gathered during said real-time bidding process.

15. The digital display system of claim 13, wherein said real time bidding process is carried out by a Supply Side Platform belonging to the computer system and exchanging data with at least one Demand Side Platform.

16. The digital display system of claim 13, wherein said computer system computes a contribution for a planned booking i corresponding to said set of at least one specific advertisement campaign for the respective digital displays of said Out Of Home inventory and at least some of the different time periods, said contribution being the difference $$P(i,j,t,x\_sot(i,j,t)) - C(j,t,a(j,t),x\_sot(i,j,t)),$$

where P(i,j,t,x_sot(i,j,t)) is the price of the planned booking i if played on digital display j in time period t with share of time x_sot, and C(j,t,a(j,t),x_sot(i,j,t)) is the cost of the lost opportunities on unplanned booking on digital display j in time period t with an available share of time a(j,t) and an allocation of share of time x_sot(i,j,t) to planned booking i, C(j,t,a(j,t),x_sot(i,j,t)) being computed based on said forecasts of unplanned bookings demand, wherein said contribution is part of an objective function and wherein said computer system is adapted to maximize said objective function on the Out Of Home inventory.

17. The computer implemented method of claim 13, wherein said objective function is a weighted sum of objectives, said contribution being one of said objectives.

18. The digital display system of claim 17, wherein said objectives further include at least one of occupancy balancing, geographical spread, and one or more booking objectives imposed by said campaign data, wherein booking objectives include at least one of audience objectives for the specific advertisement campaign and a number of digital displays displaying contents from said specific advertisement campaign.

19. The digital display system of claim 18, wherein the occupancy balancing objective is the surplus available share of time a_sup(j,t) on digital display j for time period t after allocating the planned booking i, the surplus available share of time being computed only for digital displays having:

either an availability lower than a predetermined, non-zero limit A, wherein said availability is either an available share of time a(j,t) on digital display j for time period t before allocating the planned booking i, or a forecast available share of time on digital display j for time period t.

20. The digital display system of claim 18, wherein the geographical spread objective is a sum of integer decision variables $\Sigma_k z(i,k)$, where:

i designates the planned booking, said Out Of Home inventory is divided into local clusters of digital displays and k designates each cluster, z(i,k) is either equal to 0 if planned booking i is not allocated to any digital display of cluster k, or equal to a positive constant value if planned booking i is allocated to at least one digital display of cluster k.

21. The digital display system of claim 13, wherein, when selecting unplanned bookings, said computer system is adapted to determine, within each time period and for each digital display of said Out Of Home inventory, whether any additional unplanned booking can be accepted for immediate play while respecting the share of time of planned bookings allocated to said time period for said digital display.

22. The digital display system of claim 21, wherein to check whether any additional unplanned booking can be accepted for immediate play while respecting the share of time of planned bookings allocated to said time period for said digital display, the computer system is adapted to compute, for each planned booking i, an on-schedule indicator $OSI(i,j,t,Te)=Ne(i,j,t)/(N(i,j,t)*Te/T)$, where:
T is the duration of the time period t,
Te is an elapsed time in time period t at the moment the content corresponding to the additional unplanned booking should be played,
$N(i,j,t)$ is the total number of plays that have been allocated to planned booking i for digital display j and for time period t,
$Ne(i,j,t)$ is the number of times planned booking i has been played by digital display j during time period t at elapsed time Te,
wherein all bookings correspond to contents of same duration,
and wherein the computer system is adapted to authorize said additional unplanned booking at elapsed time Te only if $OSI(i,j,t,Te)$ for each planned booking i is higher than a limit L.

23. The digital display system of claim 22, wherein said limit L is comprised between 0.8 and 1.2.

24. The digital display system of claim 21, wherein said computer system is further adapted to compare a bidding price of said additional unplanned booking and a price of a next planned booking to be played in said time period, and said computer system is adapted to order:
playing of said next planned booking by said digital display if the bidding price of said additional unplanned booking is lower than the price of said next planned booking;
playing said additional unplanned booking by said digital display if the bidding price of said additional unplanned booking is higher than the price of said next planned booking.

25. A computer implemented method for displaying contents from advertisement campaigns on digital displays belonging to an Out Of Home inventory, the computer implemented method including:
providing to a computer system, campaign data for a set of at least one specific advertisement campaign;
allocating to the set of at least one specific advertisement campaign, by said computer system, planned bookings for certain time periods and for digital displays of a specific set of digital displays from the Out Of Home inventory to fit the campaign data, for displaying contents from the set of at least one specific advertisement campaign on the digital displays of said specific set of digital displays during said time periods, said contents having durations respectively shorter than said time periods, at least some of the digital displays of said Out Of Home inventory having, at least for some time periods, an available share of time remaining for unplanned bookings;
electronically dispatching to the specific set of digital displays, content data related to said contents from said set of at least one specific advertisement campaign;
and playing said contents by said digital displays of said specific set of digital displays during said time periods,
wherein said computer system also selects, by a real-time bidding process, unplanned bookings for programmatic contents to fill-in at least partially said available share of time remaining for unplanned bookings,
and wherein, when selecting unplanned bookings, said computer system determines, within each time period and for each digital display of said Out Of Home inventory, whether any additional unplanned booking can be accepted for immediate play while respecting the share of time of planned bookings allocated to said time period for said digital display.

26. The computer implemented method of claim 25, wherein the computer system checks whether any additional unplanned booking can be accepted for immediate play while respecting the share of time of planned bookings allocated to said time period for said digital display, the computer system computes, for each planned booking i, an on-schedule indicator $OSI(i,j,t,Te)=Ne(i,j,t)/(N(i,j,t)*Te/T)$, where:
T is the duration of the time period t,
Te is an elapsed time in time period t at the moment the content corresponding to the additional unplanned booking should be played,
$N(i,j,t)$ is the total number of plays that have been allocated to planned booking i for digital display j and for time period t,
$Ne(i,j,t)$ is the number of times planned booking i has been played by digital display j during time period t at elapsed time Te,
wherein all bookings correspond to contents of same duration,
and wherein the computer system authorizes said additional unplanned booking at elapsed time Te only if $OSI(i,j,t,Te)$ for each planned booking i is higher than a limit L.

27. The computer implemented method of claim 26, wherein said limit L is comprised between 0.8 and 1.2.

28. The computer implemented method of claim 25, wherein said computer system further compares a bidding price of said additional unplanned booking and a price of a next planned booking to be played in said time period, and said computer system orders:
playing said next planned booking by said digital display if the bidding price of said additional unplanned booking is lower than the price of said next planned booking;
playing said additional unplanned booking by said digital display if the bidding price of said additional unplanned booking is higher than the price of said next planned booking.

29. A digital display system including a computer system and digital displays belonging to an Out Of Home inventory, wherein:
said computer system is adapted to allocate to a set of at least one specific advertisement campaign, planned bookings for certain time periods and for digital displays of a specific set of digital displays from the Out Of Home inventory to fit campaign data corresponding to said set of at least one specific advertisement campaign, for displaying contents from the set of at least one specific advertisement campaign on the digital displays of said specific set of digital displays during said time periods, said contents having durations respectively shorter than said time periods, at least some of the digital displays of said Out Of Home inventory having, at least for some time periods, an available share of time remaining for unplanned bookings;
said digital display system is adapted to electronically dispatch to the specific set of digital displays, content data related to said contents from said set of at least one specific advertisement campaign;

and said digital displays of said specific set of digital displays are adapted to play said contents during said time periods, wherein said computer system is also adapted to select, by a real-time bidding process, unplanned bookings for programmatic contents to fill-in at least partially said available share of time remaining for unplanned bookings, wherein said computer system has forecasts of unplanned bookings demand, including the quantity of bids and the corresponding bid prices for the respective digital display of said Out Of Home inventory and the different time periods, and wherein, when selecting unplanned bookings, said computer system is adapted to determine, within each time period and for each digital display of said Out Of Home inventory, whether any additional unplanned booking can be accepted for immediate play while respecting the share of time of planned bookings allocated to said time period for said digital display.

30. The digital display system of claim 29, wherein to check whether any additional unplanned booking can be accepted for immediate play while respecting the share of time of planned bookings allocated to said time period for said digital display, the computer system is adapted to compute, for each planned booking i, an on-schedule indicator $OSI(i,j,t,Te)=Ne(i,j,t)/(N(i,j,t)*Te/T)$, where:

T is the duration of the time period t,

Te is an elapsed time in time period t at the moment the content corresponding to the additional unplanned booking should be played, $N(i,j,t)$ is the total number of plays that have been allocated to planned booking i has been played for digital display j and for time period t, $Ne(i,j,t)$ is the number of times planned booking i has been played by digital display j during time period t at elapsed time Te, wherein all bookings correspond to contents of same duration, and wherein the computer system is adapted to authorize said additional unplanned booking at elapsed time Te only if $OSI(i,j,t,Te)$ for each planned booking i is higher than a limit L.

31. The digital display system of claim 30, wherein said limit L is comprised between 0.8 and 1.2.

32. The digital display system of claim 29, wherein said computer system is further adapted to compare a bidding price of said additional unplanned booking and a price of a next planned booking to be played in said time period, and said computer system is adapted to order:

playing of said next planned booking by said digital display if the bidding price of said additional unplanned booking is lower than the price of said next planned booking;

playing said additional unplanned booking by said digital display if the bidding price of said additional unplanned booking is higher than the price of said next planned booking.

33. The computer implemented method of claim 1, wherein said computer system forms a first Supply Side Platform exchanging data with at least one Demand Side Platform, said real time bidding process is carried out by an ad exchange module belonging to the computer system and exchanging data with said at least one Demand Side Platform and with at least one additional Supply Side Platform.

34. The computer implemented method of claim 33, wherein at least one of said Supply Side Platforms has a guarantee that bookings from said Supply Side Platform be allocated to at least one time period t on at least one digital display j of said Out Of Home inventory, wherein, when selecting bookings, said computer system either imposes bids or adapts priority of bids from said Supply Side Platform having said guarantee whenever necessary to respect said guarantee.

35. The computer implemented method of claim 34, wherein said Supply Side Platform having said guarantee, has a guaranteed share of time for said time period t and for said digital display j, wherein when choosing a bid for immediate play of a corresponding content while respecting said guarantee, the computer system computes an on-schedule indicator $OSI(s,j,t,Te)$ for said Supply Side Platform s having a guarantee, for said time period t and for said digital display j, wherein $OSI(s,j,t,Te)=Ne(s,j,t)/(N(s,j,t)*Te/T)$, where:

T is the duration of the time period t,

Te is an elapsed time in time period t at the moment the content corresponding to the chosen bid should be played, $N(s,j,t)$ is the total number of plays that have been allocated to Supply Side Platform s for digital display j and for time period t, $Ne(s,j,t)$ is the number of times a booking from said Supply Side Platform s has been played by digital display j during time period t at elapsed time Te, wherein all bookings correspond to contents of same duration, and wherein the computer system imposes selection of a bid from said Supply Side Platform having said guarantee at elapsed time Te if $OSI(s,j,t,Te)$ for said Supply Side Platform having said guarantee is lower than a limit L1.

36. The computer implemented method of claim 35, wherein several Supply Side Platforms s have a guaranteed share of time for said time period t and for said digital display j, wherein when choosing a bid for immediate play of a corresponding content while respecting said guarantee, the computer system computes said on-schedule indicator $OSI(s,j,t,Te)$ for each of said Supply Side Platforms s having a guaranteed share of time, for said at least one time period t and for said at least one digital display j, and wherein the computer system imposes selection of a bid from Supply Side Platform s0 at elapsed time Te if $OSI(s0,j,t,Te)$ for said Supply Side Platform having said guarantee is lower than said limit L1 and is lower than $OSI(s,j,t,Te)$ of all other Supply Side Platforms s having a guaranteed share of time for said time period t and for said digital display j.

37. The computer implemented method of claim 35, wherein said limit L1 is comprised between 0.8 and 1.2.

38. The digital display system according to claim 13, wherein said computer system forms a first Supply Side Platform exchanging data with at least one Demand Side Platform, said computer system has an ad exchange module adapted to carry out said real time bidding process by exchanging data with said at least one Demand Side Platform and with at least one additional Supply Side Platform.

39. The digital display system of claim 38, wherein at least one of said Supply Side Platforms has a guarantee that bookings from said Supply Side Platform be allocated to at least one time period t on at least one digital display j of said Out Of Home inventory, wherein, when selecting bookings, said computer system is adapted to either impose or restricts bids from said Supply Side Platform having said guarantee whenever necessary to respect said guarantee.

40. The computer implemented system of claim 39, wherein said Supply Side Platform having said guarantee, has a guaranteed share of time for said time period t and for said digital display j,
   wherein when choosing a bid for immediate play of a corresponding content while respecting said guarantee, the computer system is adapted to compute an on-schedule indicator $OSI(s,j,t,Te)$ for said Supply Side Platform s having a guarantee, for said time period t and for said digital display j,
   wherein $OSI(s,j,t,Te)=Ne(s,j,t)/(N(s,j,t)*Te/T)$, where:
      T is the duration of the time period t,
      Te is an elapsed time in time period t at the moment the content corresponding to the chosen bid should be played,
      $N(s,j,t)$ is the total number of plays that have been allocated to Supply Side Platform s for digital display j and for time period t,
      $Ne(s,j,t)$ is the number of times a booking from said Supply Side Platform s has been played by digital display j during time period t at elapsed time Te,
   wherein all bookings correspond to contents of same duration,
   and wherein the computer system is adapted to impose selection of a bid from said Supply Side Platform having said guarantee at elapsed time Te if $OSI(s,j,t,Te)$ if said Supply Side Platform having said guarantee is lower than a limit L1.

41. The computer implemented system of claim 40, wherein several Supply Side Platforms s have a guaranteed share of time for said time period t and for said digital display j,
   wherein when choosing a bid for immediate play of a corresponding content while respecting said guarantee, the computer system is adapted to compute said on-schedule indicator $OSI(s,j,t,Te)$ for each of said Supply Side Platforms s having a guaranteed share of time, for said time period t and for said digital display j,
   and wherein the computer system is adapted to impose selection of a bid from Supply Side Platform s0 at elapsed time Te if $OSI(s0,j,t,Te)$ for said Supply Side Platform having said guarantee is lower than said limit L1 and is lower than $OSI(s,j,t,Te)$ of all other Supply Side Platforms s having a guaranteed share of time for said time period t and for said digital display j.

42. The computer implemented system of claim 40, wherein said limit L1 is comprised between 0.8 and 1.2.

43. The computer implemented method of claim 25 wherein said computer system forms a first Supply Side Platform exchanging data with at least one Demand Side Platform, said real time bidding process is carried out by an ad exchange module belonging to the computer system and exchanging data with said at least one Demand Side Platform and with at least one additional Supply Side Platform.

44. The computer implemented method of claim 43, wherein at least one of said Supply Side Platforms has a guarantee that bookings from said Supply Side Platform be allocated to at least one time period t on at least one digital display j of said Out Of Home inventory,
   wherein, when selecting bookings, said computer system either imposes bids or adapts priority of bids from said Supply Side Platform having said guarantee whenever necessary to respect said guarantee.

45. The computer implemented method of claim 44, wherein said Supply Side Platform having said guarantee, has a guaranteed share of time for said time period t and for said digital display j,
   wherein when choosing a bid for immediate play of a corresponding content while respecting said guarantee, the computer system computes an on-schedule indicator $OSI(s,j,t,Te)$ for said Supply Side Platform s having a guarantee, for said time period t and for said digital display j,
   wherein $OSI(s,j,t,Te)=Ne(s,j,t)/(N(s,j,t)*Te/T)$, where:
      T is the duration of the time period t,
      Te is an elapsed time in time period t at the moment the content corresponding to the chosen bid should be played,
      $N(s,j,t)$ is the total number of plays that have been allocated to Supply Side Platform s for digital display j and for time period t,
      $Ne(s,j,t)$ is the number of times a booking from said Supply Side Platform s has been played by digital display j during time period t at elapsed time Te,
   wherein all bookings correspond to contents of same duration,
   and wherein the computer system imposes selection of a bid from said Supply Side Platform having said guarantee at elapsed time Te if $OSI(s,j,t,Te)$ for said Supply Side Platform having said guarantee is lower than a limit L1.

46. The computer implemented method of claim 45, wherein several Supply Side Platforms s have a guaranteed share of time for said time period t and for said digital display j,
   wherein when choosing a bid for immediate play of a corresponding content while respecting said guarantee, the computer system computes said on-schedule indicator $OSI(s,j,t,Te)$ for each of said Supply Side Platforms s having a guaranteed share of time, for said at least one time period t and for said at least one digital display j,
   and wherein the computer system imposes selection of a bid from Supply Side Platform s0 at elapsed time Te if $OSI(s0,j,t,Te)$ for said Supply Side Platform having said guarantee is lower than said limit L1 and is lower than $OSI(s,j,t,Te)$ of all other Supply Side Platforms s having a guaranteed share of time for said time period t and for said digital display j.

47. The computer implemented method of claim 45, wherein said limit L1 is comprised between 0.8 and 1.2.

48. The digital display system according to claim 29, wherein said computer system forms a first Supply Side Platform exchanging data with at least one Demand Side Platform, said computer system has an ad exchange module adapted to carry out said real time bidding process by exchanging data said at least one Demand Side Platform and with at least one additional Supply Side Platform.

49. The digital display system of claim 48, wherein at least one of said Supply Side Platforms has a guarantee that bookings from said Supply Side Platform be allocated to at least one time period t on at least one digital display j of said Out Of Home inventory,
   wherein, when selecting bookings, said computer system either is adapted to impose or restrict bids from said Supply Side Platform having said guarantee whenever necessary to respect said guarantee.

50. The computer implemented method of claim 49, wherein said Supply Side Platform having said guarantee, has a guaranteed share of time for said time period t and for said digital display j, wherein when choosing a bid for immediate play of a corresponding content while respecting said guarantee, the computer system is adapted to compute an on-schedule indicator $OSI(s,j,t,Te)$ for said Supply Side Platform s having a guarantee, for said time period t and for said digital display j, wherein $OSI(s,j,t,Te)=Ne(s,j,t)/(N(s,j,t)*Te/T)$, where:

s designates said Supply Side Platform having a guarantee,

T is the duration of the time period t,

Te is an elapsed time in time period t at the moment the content corresponding to the chosen bid should be played, $N(s,j,t)$ is the total number of plays that have been allocated to Supply Side Platform s for digital display j and for time period t, $Ne(s,j,t)$ is the number of times a booking from said Supply Side Platform s has been played by digital display j during time period t at elapsed time Te, wherein all bookings correspond to contents of same duration, and wherein the computer system is adapted to impose selection of a bid from said Supply Side Platform having said guarantee at elapsed time Te if $OSI(s,j,t,Te)$ for said Supply Side Platform having said guarantee is lower than a limit L1.

51. The computer implemented method of claim 50, wherein several Supply Side Platforms s have a guaranteed share of time for said time period t and for said digital display j, wherein when choosing a bid for immediate play of a corresponding content while respecting said guarantee, the computer system is adapted to compute said on-schedule indicator $OSI(s,j,t,Te)$ for each of said Supply Side Platforms s having a guaranteed share of time, for said at least one time period t and for said at least one digital display j, and wherein the computer system is adapted to impose selection of a bid from Supply Side Platform s0 at elapsed time Te if $OSI(s0,j,t,Te)$ for said Supply Side Platform having said guarantee is lower than said limit L1 and is lower than $OSI(s,j,t,Te)$ of all other Supply Side Platforms s having a guaranteed share of time for said time period t and for said digital display j.

52. The computer implemented method of claim 50, wherein said limit L1 is comprised between 0.8 and 1.2.

* * * * *